United States Patent
VanDuyn et al.

(10) Patent No.: US 10,606,371 B2
(45) Date of Patent: *Mar. 31, 2020

(54) SYSTEM AND METHOD FOR DATA ITEM FILTERING BASED ON CHARACTER SEQUENCE ENTRY

(71) Applicant: DISH Technologies L.L.C., Englewood, CO (US)

(72) Inventors: Luke VanDuyn, Highlands Ranch, CO (US); Henry Gregg Martch, Parker, CO (US); Morgan Haden Kirby, Palmer Lake, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,536

(22) Filed: Apr. 27, 2018

(65) Prior Publication Data

US 2018/0246583 A1    Aug. 30, 2018

Related U.S. Application Data

(63) Continuation of application No. 13/110,715, filed on May 18, 2011, now Pat. No. 10,013,077.
(Continued)

(51) Int. Cl.
*G06F 3/023* (2006.01)
*G06F 17/27* (2006.01)

(52) U.S. Cl.
CPC .......... *G06F 3/0237* (2013.01); *G06F 17/276* (2013.01)

(58) Field of Classification Search
None
See application file for complete search history.

(56) References Cited

U.S. PATENT DOCUMENTS

| | | | |
|---|---|---|---|
| 7,130,846 | B2 | 10/2006 | Danker et al. |
| 7,957,955 | B2 | 6/2011 | Christie et al. |

(Continued)

FOREIGN PATENT DOCUMENTS

| | | |
|---|---|---|
| EP | 2 293 168 A1 | 3/2011 |
| WO | 00/38041 A1 | 6/2000 |
| WO | 2009/127168 A1 | 10/2009 |

OTHER PUBLICATIONS

European Search Report for EP 11168752 dated Jan. 17, 2013, all pages.
(Continued)

*Primary Examiner* — Cai Y Chen

(74) *Attorney, Agent, or Firm* — Kilpatrick Townsend & Stockton LLP

(57) ABSTRACT

A method of filtering a plurality of data items according to user input is presented. Each of the data items, such as media content files, is identified via a multiple-character identifier. In the method, a collection of individual characters is presented to a user for selection. A character sequence is received from the user, wherein the character sequence includes at least one character selection selected from the collection of individual characters. For each character selection in the sequence, more than one character from the collection is associated with the character selection. The data items are then filtered based on the associated characters corresponding to each character selection.

18 Claims, 8 Drawing Sheets

Related U.S. Application Data

(60) Provisional application No. 61/365,646, filed on Jul. 19, 2010.

(56) References Cited

U.S. PATENT DOCUMENTS

| | | | |
|---|---|---|---|
| 2004/0078816 A1* | 4/2004 | Johnson | H04N 5/44543 725/52 |
| 2004/0194141 A1* | 9/2004 | Sanders | G06F 17/30817 725/53 |
| 2004/0268250 A1 | 12/2004 | Danker et al. | |
| 2008/0167858 A1 | 7/2008 | Christie et al. | |
| 2012/0013804 A1 | 1/2012 | VanDuyn et al. | |

OTHER PUBLICATIONS

U.S. Appl. No. 13/110,715, filed May 18, 2011 Non-Final Rejection dated Jun. 17, 2013, all pages.
U.S. Appl. No. 13/110,715, filed May 18, 2011 Final Rejection dated Nov. 1, 2013, all pages.
U.S. Appl. No. 13/110,715, filed May 18, 2011 Non-Final Rejection dated Jun. 18, 2014, all pages.
U.S. Appl. No. 13/110,715, filed May 18, 2011 Final Rejection dated Nov. 6, 2014, all pages.
U.S. Appl. No. 13/110,715, filed May 18, 2011 Non-Final Rejection dated May 11, 2015, all pages.
U.S. Appl. No. 13/110,715, filed May 18, 2011 Final Rejection dated Dec. 4, 2015, all pages.
U.S. Appl. No. 13/110,715, filed May 18, 2011 Notice of Allowance dated Jan. 29, 2018, all pages.

* cited by examiner

SYSTEM AND METHOD FOR DATA ITEM FILTERING BASED ON CHARACTER SEQUENCE ENTRY

CROSS-REFERENCES TO RELATED APPLICATIONS

This application is a continuation of U.S. application Ser. No. 13/110,715, filed May 18, 2011, which claims priority under 35 U.S.C. § 119(e) to U.S. Provisional Application Ser. No. 61/365,646, filed Jul. 19, 2010, which are both herein incorporated by reference in their entireties.

BACKGROUND

For an increasing number of electronic devices, a particular data item, such as a data file or an audio and/or video recording, may be found and selected by way of a search mechanism, by which the user begins entering via a user interface of the device an identifier for the item, such as a file name, a title, or the like. As the user enters each character of the identifier, each of the items accessible via the electronic device that conforms to the characters that have been input remain available, with other items being removed from view. For example, if a user attempting to access one of a number of movies by way of the device has entered the letters "b", "a", and "c", in order into a search menu, movie titles such as "Back to the Future" and "Backdraft" would remain accessible to the user, but others, such as "Battle of the Bulge" and "Babes in Toyland", would be removed. Subsequently entering a "k" followed by a "d" would then remove "Back to the Future" from the display, leaving "Backdraft" and any other entries beginning with the first five letters "backd" available for access. Typically, at any point during the data entry phase, the user may select one of the remaining items featured on the display by selecting the entry directly, such as by way of a cursor or other data selection means.

To allow the user to enter alphanumeric characters during this filtering or searching process, the device may provide a keyboard-like interface in which a collection or array of characters is presented, wherein any one or more of the characters may be selected or activated by the user. However, given the number of characters that may be used in an identifier, often including any of twenty-six letters, ten digits, and several special-purpose characters, selecting or activating each desired character in the proper order may present a challenge for the user. This difficulty may be further exacerbated by the physical nature of the user interface being employed. For example, the selection area for each character may be small, and the selection areas may be positioned in close proximity to each other, making user selection of any specific character somewhat difficult.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

For many types of electronic devices, such as desktop and laptop computers, mobile communication devices, television receivers, digital video recorders (DVRs), digital cameras, gaming systems, and the like, a user may want to access a particular data item from many such items available through the device. The data items may include, but are not limited to, data files, media content programs, contact information entries, or any other set of items in which each item may be identified or labeled by way of a unique sequence of characters. Presuming the number of data items available to the user is large enough to make a manual search of the items burdensome, the user may filter the set of data items to reduce the number of items shown to a more manageable level by submitting at least a portion of the identifier of the desired data item as search criteria.

Figure 1:
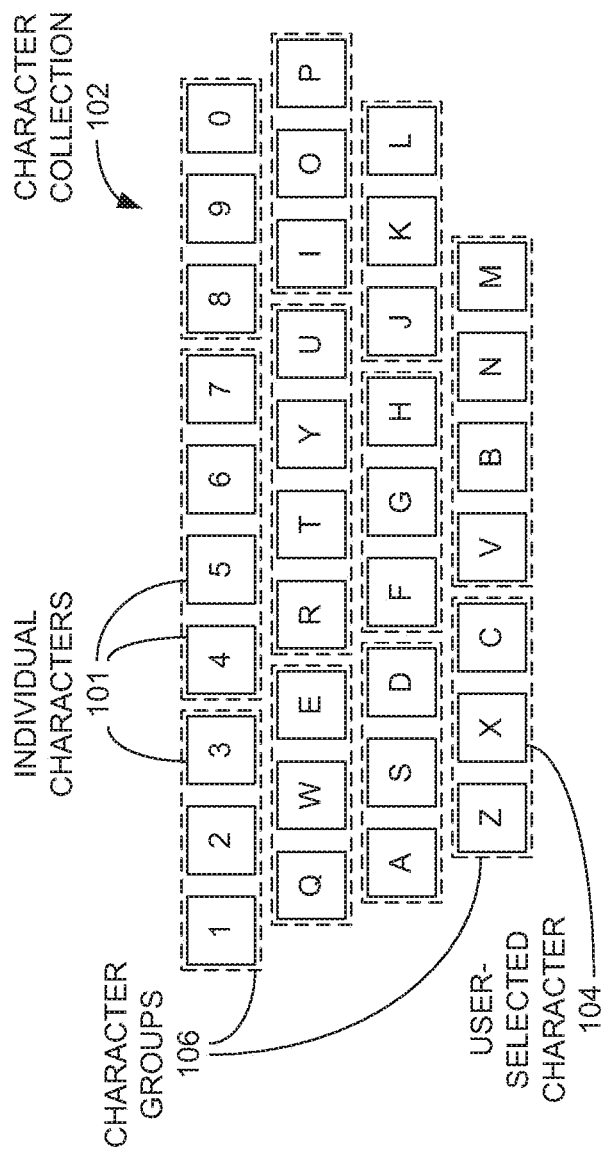
FIG. 1 is a graphical representation of a collection of individual characters with character groups highlighted according to an embodiment of the invention.

FIG. 1 illustrates a character collection 102 to be used as input for filtering a set of data items. In this case, the collection 102 of individual characters 101 is organized as a QWERTY-style keyboard, although any other arrangement and set of characters may be used in other implementations. The characters 101 may include any or all of letters, numbers, special-purpose characters, and so on. The characters 101 are organized into a number of character groups 106. As is discussed in greater detail below, the groups 106 allow some inaccuracy in the entry of search criteria while facilitating reasonable search results. More specifically, when a user selects a character 104, all of the characters 101 in the group 106 in which the selected character 104 is located are employed as part of the search criteria.

Figure 2:
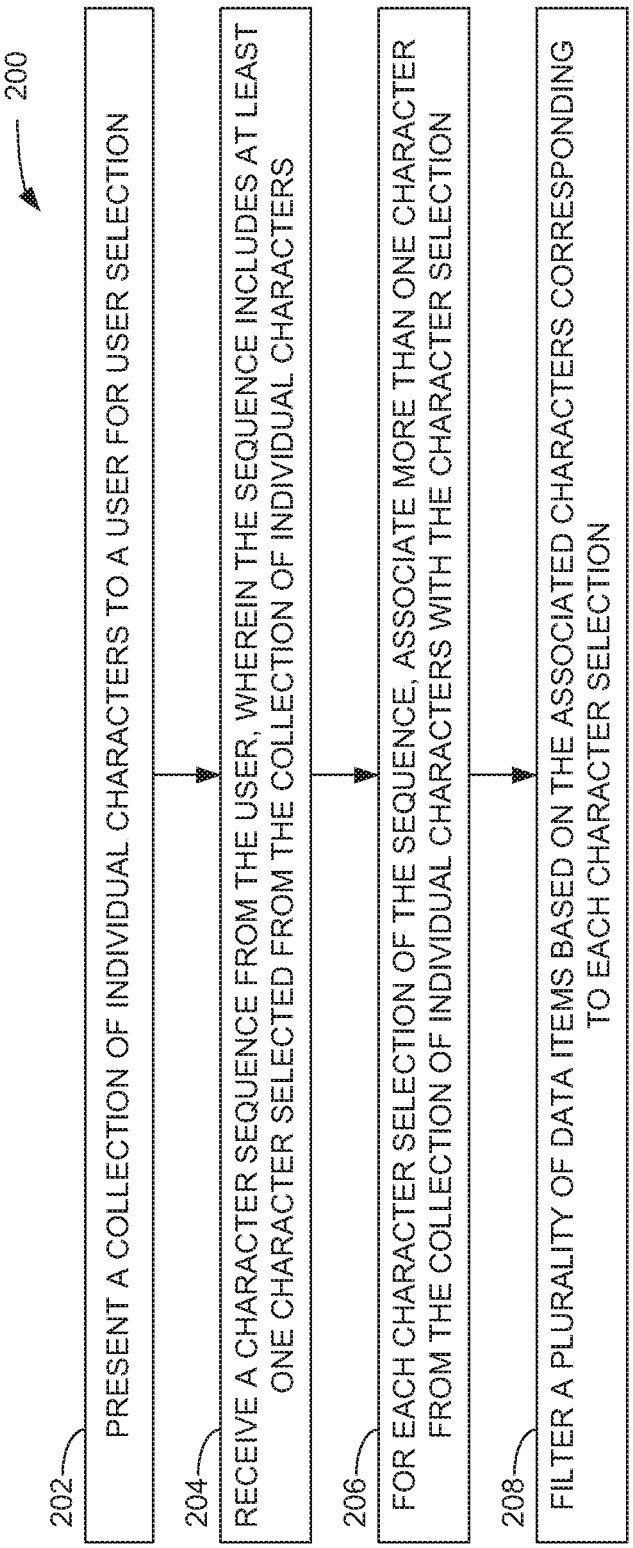
FIG. 2 is a flow diagram of a method according to an embodiment of the invention of filtering a plurality of data items according to user input provided by way of the collection of characters of FIG. 1.

Using FIG. 1 for reference, FIG. 2 presents a method 200 of filtering a plurality of data items according to user input. Each of the data items is identified by way of a multiple-character identifier, such as a name, label, title, or some form of metadata associated with the data item. In the method 200, a collection 102 of individual characters 101 is presented to the user for selection (operation 202). A character sequence is received from the user, wherein the sequence includes at least one character 101 selected from the collection 102 of individual characters 101 (operation 204). For each character selection of the sequence, more than one character 101 from the collection 102 of individual characters 101 is associated with the character selection (operation 206). The plurality of data items is filtered based on the associated characters corresponding to each character selection (operation 208). In other embodiments, a computer-readable storage medium may have encoded thereon instructions for a processor or other control circuitry of an electronic device to implement the method 200.

As a result of employing the method 200, the user may input a character sequence to search for a particular data item with some level of inaccuracy while the desired data item still remains accessible after the filtering of the data items has occurred. Additional advantages may be recognized from the various implementations of the invention discussed in greater detail below.

Figure 3A:
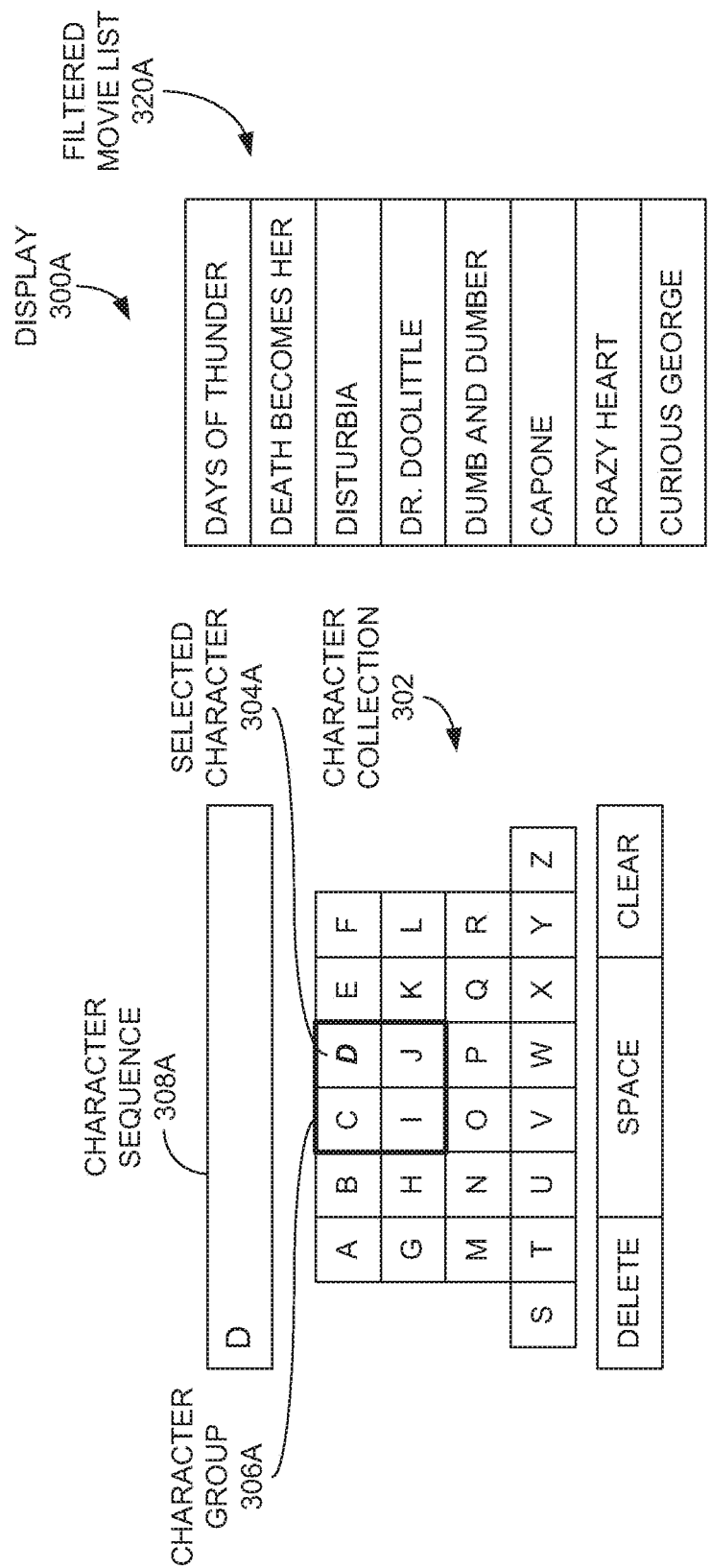
FIGS. 3A, 3B, and 3C provide an example of a display when filtering a list of movies according to a character sequence being input by a user as search criteria according to an embodiment of the invention.
Figure 3B:
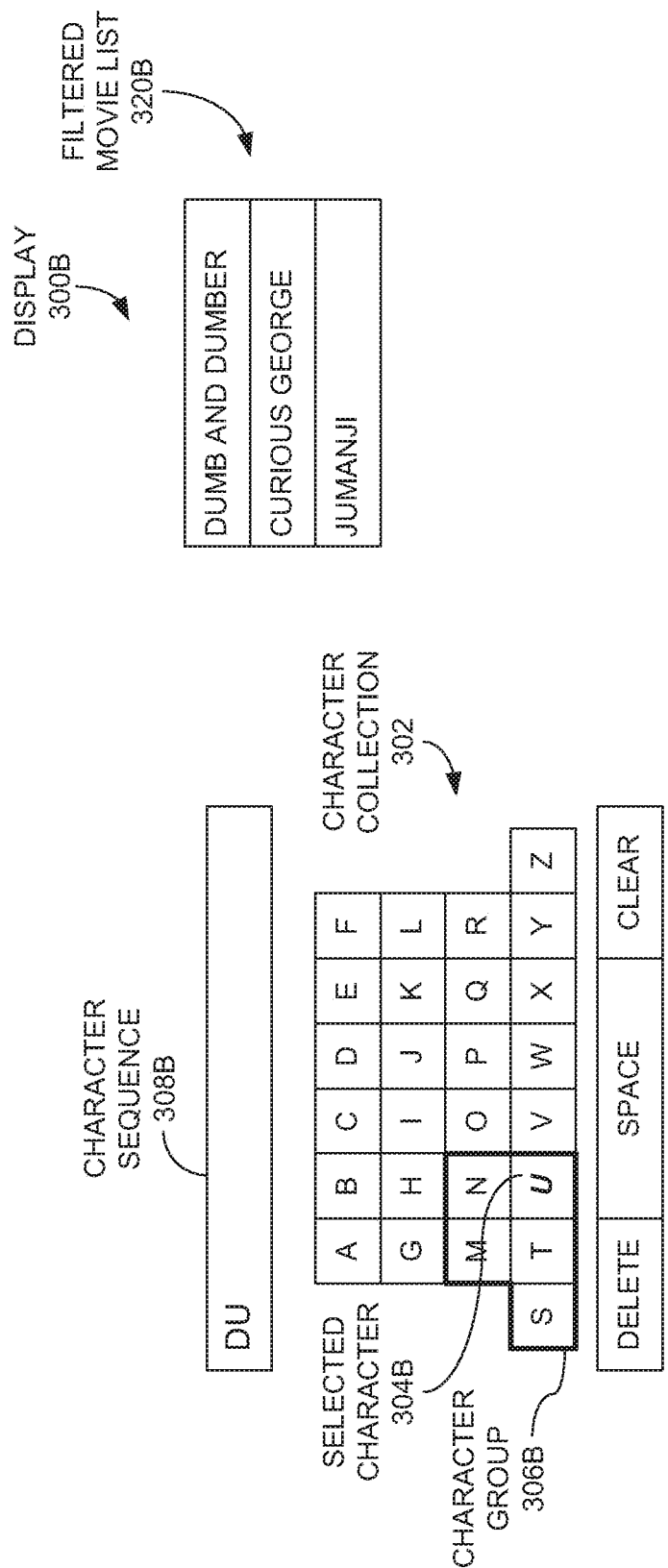
Figure 3C:
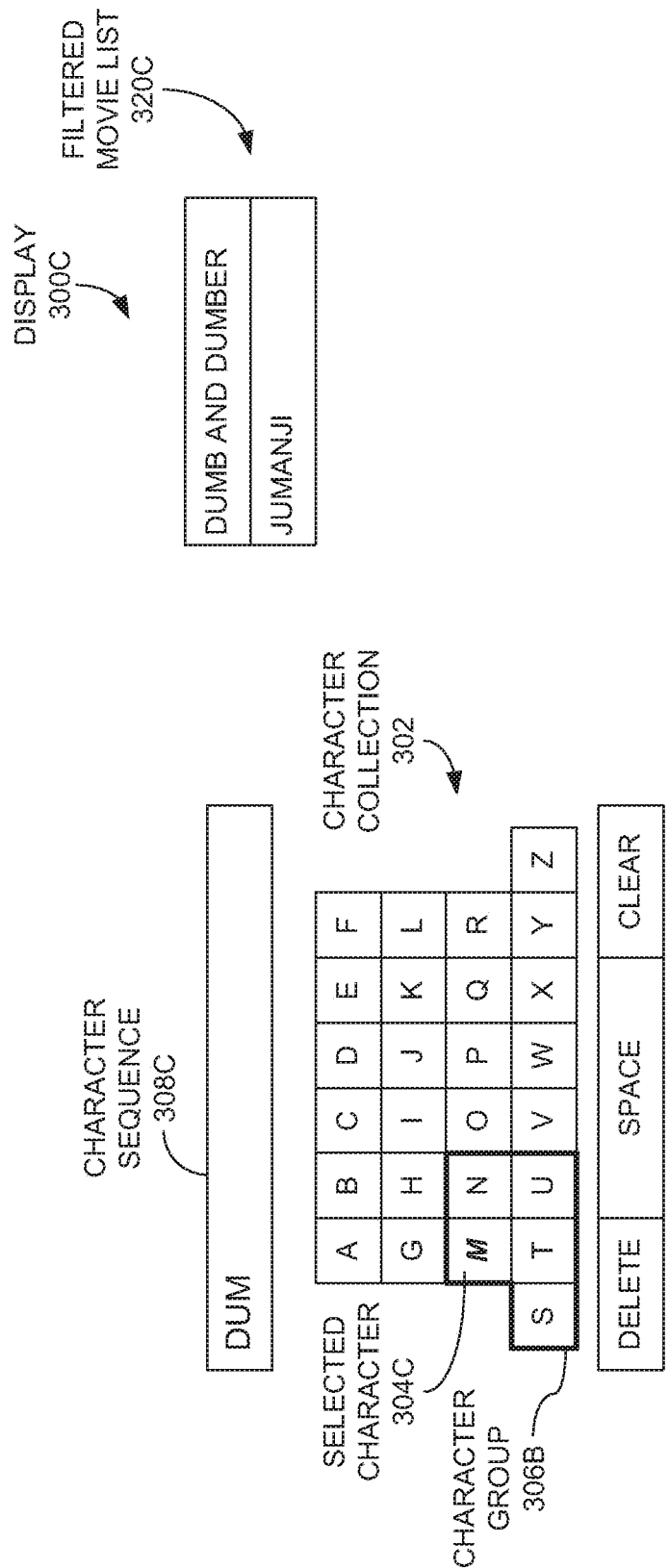

FIGS. 3A through 3C depict a display 300 of the progression a specific example of a user entering a character sequence to search for a particular movie or program. In this particular application, numerous movies are available for viewing via an electronic device, such as a computer, television receiver, mobile communication device, or the like. To access a specific movie, the user may use a search facility such as that portrayed in FIGS. 3A through 3C, in which the user employs an onscreen character collection 302 to begin entering a character sequence 308 representing the first few letters of the title of the desired movie. As each character is entered, search results are presented in the filtered movie list 320 appearing on the right side of the display 300. Further, as each subsequent character is entered, the filtered movie list 320 is filtered and updated as directed by the character sequence 308. Alternatives to a simple list, such as graphic representations of the movies, may be employed in other examples.

In FIG. 3A, the user has selected a first character 304A for the character sequence 308A: a "D". In one implementation, the user selects the character 304A by way of a cursor-driven interface, such as by way of a mouse, touchpad, or other graphical interface means, either directly provided by way of the electronic device or via a remote control unit. Given the inaccuracy that may result from the use of such an input device or mechanism, the user may not always select the intended character 304. To address this possibility, each of the characters of the character collection 302 is associated with a character group 306. In the specific example of FIG. 3A, the letter "D" resides within a character group 306A that also includes the letters "C", "I", and "J". As shown in FIG. 3A, the particular group 306A including the selected character 304A is highlighted or outlined as a courtesy to the user; in other examples, such highlighting may not be used. Also, the character 304 to be selected is emphasized in bold and italics for the user's benefit. In this specific example, the groups 306 extend over both multiple rows and multiple columns. Other embodiments may provide groups 306 that are contained within a single row or column. Further, the same number of characters need not be included in each of the groups 306 of the character collection 302. Other characters, such as the "space" character, may reside within their own group 306, or may not be included with the character collection 302. Other controls helpful for data entry, such as the "delete" and "clear" functions shown in FIGS. 3A through 3C, may or may not be included in the display 300, depending on the particular implementation.

In yet another embodiment, the extent of each group 306 may be determined by the specific character 304 selected by the user. For example, if the user selects the letter "D", other characters surrounding the letter "D", such as "C", "E", "I", "J", and "K" (or, alternatively, "C", "E", and "J") may be incorporated within the same group 306 along with the letter "D". If, instead, the user selects the letter "C", other letters added to the same group 306 as "C" nay include "B", "D", "H", "I", and "J" (or, alternatively, "B", "D", and "I"). As a result, many of the possible groups 306 may overlap. One possible rationale for defining the groups in this manner is that the character that the user most likely wanted to select may be either the actual character selected, or some character located adjacent to the selected character.

Based on the group 306A containing the selected character 304A, all movies beginning with the letters "C", "D", "I", and "J" form part of the filtered movie list 320A, with all other programs being removed therefrom. In the specific example of FIG. 3A, the movies having titles beginning with the selected character 304A are listed first, in alphabetical order. Those entries are then followed by those beginning with the other letters of the group 306A (i.e., "C", "I", and "J"). By presenting the movies in the filtered list 320A in this order, search results associated with the actual selected character 304A are presented first, thus biasing the filtered list 320A toward the presumption that the selected character 304A was the intended user selection. Other orders of presentation in the list 320A, such as strictly alphabetical, may be employed in alternate implementations.

In FIG. 3B, the user has entered a second selected character 304B (i.e., the letter "U"), Which has been added to the character sequence 308B. As shown in the character collection 302, the selected character 304B constitutes part of a larger character group 306B that also includes the letters "M", "N", "S", and "T" in addition to the selected "U". As a result, after the user enters the second selected character 304B, the filtered movie list 320B includes all movies whose first letter is within the first character group 306A, and whose second letter lies within the second character group 306B. In one embodiment, the movie titles whose first two letters match the character sequence 308B (i.e., "DU") are presented first in the list 320B, followed by other combinations in some predetermined order, such as alphabetical order.

In FIG. 3C, the user has entered a third selected character 304C (i.e., the letter "M"), which is part of the same character group 306B in which the second selected character 304B (i.e., the letter "U") was located. Thus, the resulting character sequence 308C of "DUM", including the letters of the associated characters groups 306A, 306B, results in two movies titles remaining in the filtered list 320C: (i.e., "Dumb and Dumber" and "Jumanji"). In this case, the first entry of the list 320C exactly matches the character sequence 308C, while the second entry is present as a result of the filtering associated with other letters within the character groups 306A, 306B. As a result, if the user intended to enter the letters "JUM", but instead had mistakenly entered the sequence "DUM", any matches associated with the letters "JUM" (in this case, "Jumanji"), would be provided in the filtered list 320C as well. The same is true of all other possible combinations involving the character groups 306A, 306B. In the specific example of FIGS. 3A-3C, movie titles matching any of the possible sequences provided in the character groups 306A, 306B would also be included in the filtered list 320.

In the example described above, the first selected character 304A of the sequence 308C is compared to the first letter of each of the movie titles, with each subsequent character 304B, 304C of the sequence 308C being compared with each corresponding letter of the titles. In other implementations, the first selected character 304A of the sequence 308C may be compared against any Nth letter of each title, with subsequent characters of the sequence being compared against subsequent letters N+1, N+2, and so on, in the title. Such implementations would not only allow minor inaccuracies in user entry of the search sequence, as described above, but also would allow matching of the search sequence with interior portions of the various movies titles.

As a result of the embodiment of FIGS. 3A through 3C, the user may be somewhat inaccurate in entering the desired character sequence 308 in searching for a particular program, and yet have the intended program provided within the filtered list 320. Further, the position of the intended program within the list 320 may depend at least in part on how accurately the user entered the sequence, with more prominent areas of the list being associated with program titles that more closely match the character sequence 308.

Figure 4:
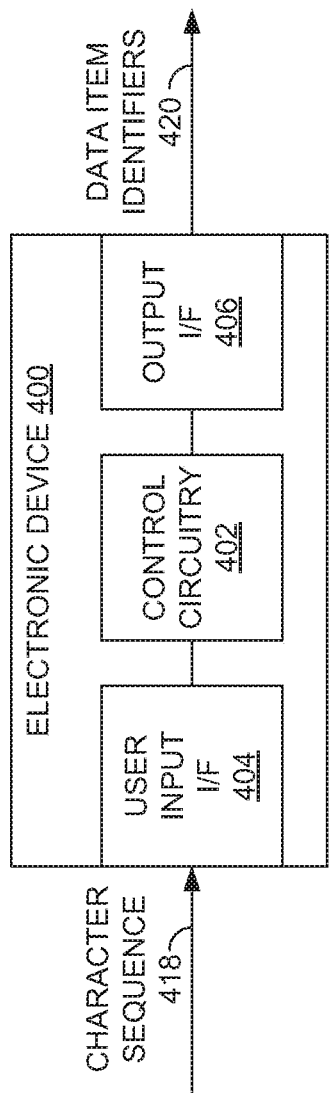
FIG. 4 is a block diagram of an electronic device according to an embodiment of the invention.

FIG. 4 presents a block diagram of an electronic device 400, such as a general-purpose computer, television receiver or set-top box, mobile communication device, personal digital assistant (PDA), digital video recorder (DVR), digital video disk (DVD) player, digital still camera, digital video camcorder, or any other device capable of filtering data items as discussed above. Further, the data items to be filtered or searched may be any items associated with a unique name, title, or label including multiple characters, such as letters, numbers, and punctuation or other special characters. For example, any set of media content files, such audio and/or video television programs, movies, and the like, may be searched as described herein. Other examples include, but are not limited to, standard digital data files (such as word processing documents, spreadsheets, and so on), music files, e-mail messages, contact information files (such as files containing a name, address, phone number, and related information for a particular individual), and word banks for Short Message Service (SMS) text entry systems.

The electronic device 400 includes control circuitry 402, a user input interface 404, and an output interface 406. Generally, the user input interface 404 is configured to receive a character sequence 418 from the user to be used to search for a particular data item accessible via the device 400. The output interface 406 provides the data item identifiers 420, filtered, unfiltered, or both, to the user, either directly by way of a display component, or indirectly via an external display device, such as a television or monitor. The electronic device 400 may also include other circuitry necessary to perform various functions, such as a communication or network interface and various data processing circuits. However, such circuitry is not shown in FIG. 4 nor described further herein to simplify the following discussion.

Figure 5:
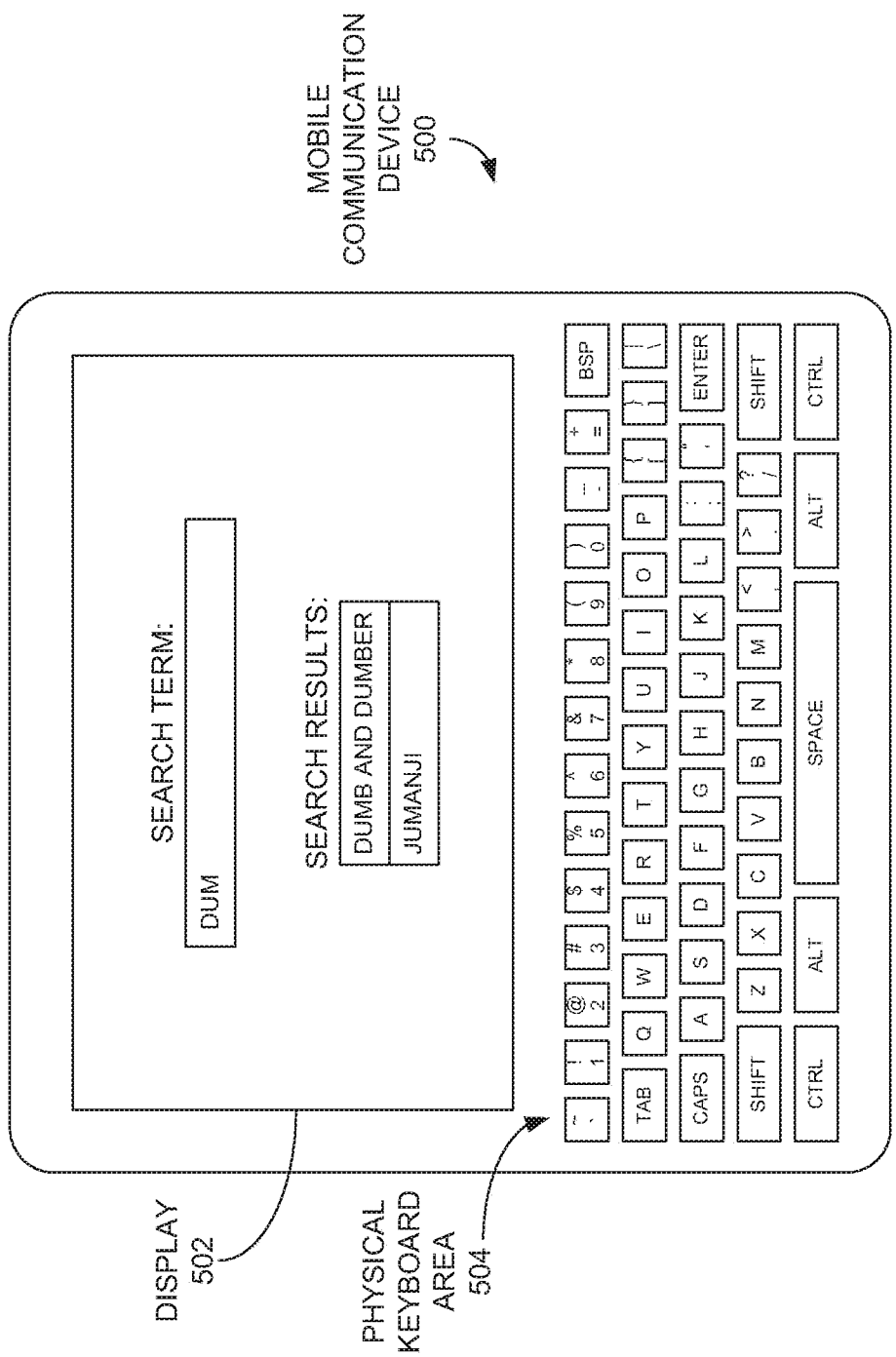
FIG. 5 is a graphical representation of a wireless communication device according to an embodiment of the invention.

The user input interface 404 may be any input interface configured to receive a character sequence from a user for searching or filtering purposes. In one example, the user input interface 404 may be a keyboard-type input mechanism presenting a collection of characters, any of which the user may press or otherwise activate. The keyboard may be integrated within the electronic device 400, or coupled thereto via wired or wireless means. FIG. 5 provides a particular example of a wireless communication device 500 having a display 502 that may be employed as the output interface 406 of FIG. 4. The device 500 provides a separate physical keyboard area 504 presenting individual characters for user selection. In another example, the display 502 may represent a touch screen or similar user input/output device by which the user may view the data item identifiers 420 as well as a character collection through which the user may enter the character sequence described above. In that particular implementation, the touch screen would be employed as both the user input interface 404 and the output interface 406 of the electronic device 400.

In another example, the user input interface 404 may be a remote control interface configured to receive user input by way of infrared (IR), radio frequency (RF), optical, acoustic, or other wireless signals. Such a user input interface may allow the user to manipulate a cursor or similar character selection means about a display such as that shown in FIGS. 3A through 3C, which may be viewable via the output interface 406.

The control circuitry 402 is configured to process the various data items to be filtered or searched. The control circuitry 402 is also structured to communicate with the user input interface 404 to receive the character sequence 418, and to employ the sequence 418 to search or filter the data items via their corresponding identifiers as discussed in greater detail above. The control circuitry 402 also presents the data item identifiers 420, such as in a filtered, and possibly unfiltered, state via the output interface 406 to the user. The control circuitry 402 may include one or more processors, such as a microprocessor, microcontroller, or digital signal processor (DSP), configured to execute instructions directing the processor to perform the functions associated with the control circuitry 402. In another implementation, the control circuitry 402 may be completely hardware-based logic, or may include a combination of hardware, firmware, and/or software elements.

Figure 6:
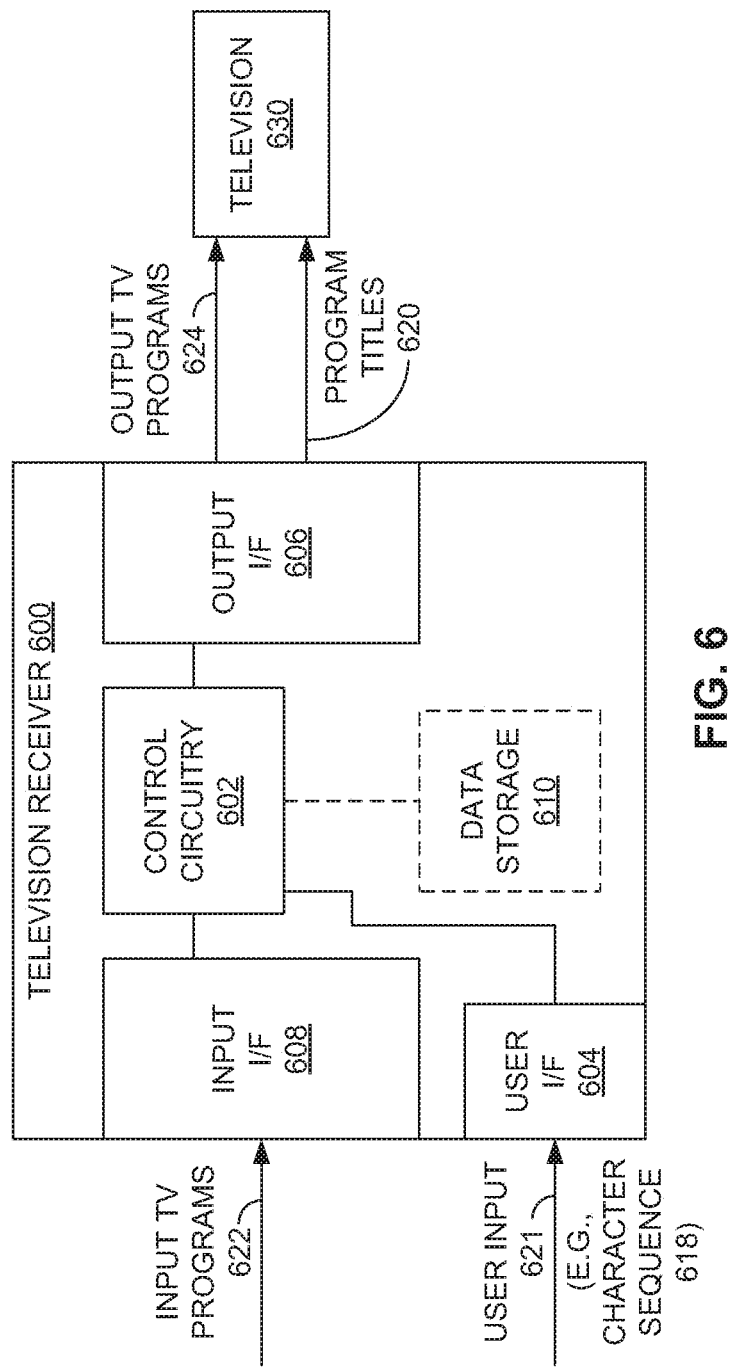
FIG. 6 is a block diagram of a television receiver according to an embodiment of the invention.

A more specific example of an electronic device capable of filtering a plurality of data items is presented in the block diagram of a television receiver or set-top box 600 presented in FIG. 6. Examples of the television receiver 600 include terrestrial, cable, and satellite television receivers. The television receiver 600 includes control circuitry 602, a user interface 604, an output interface 606, and an input interface 608, possibly along with data storage 610 for television programs. Other components often associated with a television receiver, such as a power supply and a "smart card" interface, may be included in the receiver 600 but are not discussed further hereinafter to simplify the discussion below.

The input interface 608 is configured to receive television programs 602 by way of a satellite, cable head-end, terrestrial antenna, or other television signal source. For example, in the case of a satellite receiver 600, the input interface 608 may be coupled to a parabolic antenna with an attached low-noise block-converter (LNB) that receives the signals, down-converts the frequencies thereof, and forwards the resulting intermediate-frequency (IF) signals carrying the television programs 622 to the input interface 608. In turn, the input interface 608 may demodulate, demultiplex, decrypt, and otherwise process the television signals for use by the output interface 606. More specifically, the demultiplexing process may involve the selection of one or more channels of television programming based on user input for viewing and/or recording of the programming carried on the selected channel. In one implementation, the signal carries multiple television programming channels whose data is formatted according to one of the Motion Picture Experts Group (MPEG) formats, such as MPEG-2 or MPEG-4, although other television content format standards may be utilized in other embodiments.

The output interface 606 reformats and delivers the television programs from the input interface 608 as output television programs 624 to the television 630. To that end, the output interface 608 may encode the television programs 624 in accordance with one or more television output formats. For example, the output interface 606 may format the programs 624 for one or more of a composite or component video connection with associated audio connection, a modulated radio frequency (RF) connection, a High-Definition Multimedia Interface (HDMI) connection, or any other format compatible with the television 630.

To allow a user of the receiver 600 to control the selection of the input television programs 622, input character sequences as discussed above for the filtering or searching of the programs 622, and perform other operations typically associated with a television receiver 600, the user interface 604 may facilitate the entry of commands by way of user input 621. In many examples, the user interface 604 may be a remote control interface configured to receive such input 621 by way of infrared (IR), radio frequency (RF), acoustic, or other wireless signal technologies. To facilitate such information entry, the receiver 600 may provide a menu system presented to the user via the television 630. In some implementations, the user interface 612 may also include any of a keyboard, mouse, and/or other user input device.

The receiver 600 may also include data storage 610 for storing one or more of the input television programs 622 for subsequent viewing by the user. As a result, the data storage 610 may be operated as an integrated digital video recorder (DVR). The data storage 610 may include any kind of volatile data memory (such as static random-access memory (SRAM) and dynamic random-access memory (DRAM)) and/or non-volatile memory (including, but not limited to, flash memory, hard disk drive storage, and optical disk storage).

The control circuitry 602 is configured to control and/or access other components of the receiver 304, including, but not limited to, the user interface 604, the output interface 606, the input interface 608, and the data storage 610 (if included). The control circuitry 602 may include one or more processors, such as a microprocessor, microcontroller, or DSP, configured to execute instructions directing the processor to perform the functions associated with the control circuitry 602. In another implementation, the control circuitry 602 may be completely hardware-based logic, or may include a combination of hardware, firmware, and/or software elements.

In operation, the control circuitry 602 may present a search menu or similar visual interface via the output interface 606 and the television 630 to the user. For example, the control circuitry 602 may present an electronic program guide (EPG) identifying programs expected to be broadcast over some future time period, such as the following ten days. To search for a particular program to be received during that time period, the user may navigate to the search menu EPG, such as the display 300 shown in FIGS. 3A-3C. Using the menu, the user may enter a character sequence 618 as described in detail above to find a particular program of interest. The control circuitry 602 may then process the programs identified in the EPG based on the character sequence 618 to generate a list of program titles 620 indicated by the character sequence 618 and present that list 620 via the EPG, as shown via the output interface 606 and the television 630, to the user. In response, the user may then select one of the programs 622 from the list of titles 620 via the user interface 604 for the purpose of viewing or recording the program, setting a reminder to view the program, or perform some other function regarding the program.

In another embodiment, the user may navigate to a menu providing a list of previous recorded programs 622 stored in the data storage 610 of the receiver 600. The user may then employ a similar search interface to that illustrated in FIGS. 3A-3C and more fully described above to locate a desired program in the data storage 610 for playback.

In further implementations of the receiver 600, program identifiers other than the title of the program may be used to select a particular program. Any other identifying information associated with a television program or movie, including but not limited to the release date, the names of actors, and the name of the director or producer, may be employed as information to be compared against a character sequence for search purposes. Further, such information need not be unique for each program, thus resulting in several programs possibly matching the character sequence provided by the user.

In other electronic devices, the data items to be searched or filtered need not be restricted to television programs or other types of data files, but may be any data item that may be identified or associated with a character string. For example, in the case of a mobile communication device, computer, or the like, multiple data items of personal contact information, wherein each item is a data structure containing the name, address, phone number, e-mail address, and/or other identifying information associated with a particular person or entity, may be searched or filtered in a manner similar to that described above using any of these data fields.

In yet another example, text may be generated in a mobile or other communication device by way of a word bank or dictionary being searched via a similar mechanism. For example, the user may begin typing a desired word into a keyboard-formatted display. In response, the control circuitry of the device may present a list of words exactly or nearly matching the characters input by the user according to the concepts described above. The user may then select one of the listed words rather than continue to type in the desired. Such a device would thus allow the user to select the correct word even if the characters already entered did not exactly match the desired word.

At least some embodiments as described herein thus provide a search or filtering functionality, operational upon multiple data items, wherein the user is not required to specify the search characters with complete accuracy. In some implementations, the resulting filtered items may be arranged in such an order that the items exactly matching the search characters are listed more prominently than others, thus rewarding more accurate character sequence entry. The remaining displayed items not matching the character sequence exactly may be further prioritized by ranking the results according to how closely the sequence matches the identifiers associated with the data items. As a result, faster searches of data items may occur, as the user need not reenter a search term or character sequence if the characters were not entered correctly.

While several embodiments of the invention have been discussed herein, other implementations encompassed by the scope of the invention are possible. For example, while various embodiments have been described largely within the context of television receivers or set-top boxes, other electronic devices capable of providing access to multiple data items, such as computers, mobile communication devices, DVD players, gaming systems, and the like, may incorporate various aspects of the functionality described above to similar effect. Further, the searching or filtering may be performed on any type of data item or structure which may be identified by a name, title, label, or other data or metadata associated with the item. In addition, aspects of one embodiment disclosed herein may be combined with those of alternative embodiments to create further implementations of the present invention. Therefore, while the present invention has been described in the context of specific embodiments, such descriptions are provided for illustration and not limitation. Accordingly, the proper scope of the present invention is delimited only by the following claims and their equivalents.

What is claimed is:

1. A television receiver comprising:
an input interface configured to receive television programs, wherein each of the television programs is associated with an identifier comprising a series of textual characters;
an output interface configured to process and transmit the received television programs to a television for presentation to a user;
a user interface configured to receive a search request from the user for one of the television programs, wherein the search request comprises a character sequence entered via a collection of individual characters presented to the user via the output interface, wherein the character sequence comprises at least one character selection selected from the collection of individual characters; and
control logic configured to:
associate more than one character from the collection of individual characters with each character selected by the user, where the associating is based at least in part on organizing the collection of individual characters into multiple distinct groups of characters, wherein all characters of one group of the multiple distinct groups are associated with a character selection if the selected character comprises one of the characters of the one group;
filter the identifiers for the television programs based on the associated characters corresponding to each character selection, wherein the identifiers comprise at least one title of at least one of the television programs; and
present the identifiers remaining after the filtering via the output interface for presentation to the user, wherein the identifiers comprise the at least one title of the at least one of the television programs that does not include the character sequence.

2. The television receiver of claim 1, wherein:
the control logic is configured to present the identifiers remaining after the filtering in an electronic program guide indicating when the television programs are accessible at the input interface.

3. The television receiver of claim 1, further comprising:
data storage configured to store the television programs;
wherein the control logic is configured to present the identifiers remaining after the filtering for the stored television programs.

4. The television receiver of claim 1, wherein the filtering comprises comparing the associated characters to subsets of characters within the identifiers for the television programs.

5. The television receiver of claim 4, wherein the comparing the associated characters to the subsets of characters within the identifiers for the television programs comprises comparing the associated characters to internal character strings within the identifiers, where the internal character strings do not include first characters beginning the identifiers.

6. The television receiver of claim 1, wherein at least identifier of the identifiers remaining after the filtering includes the associated characters corresponding to all of the character sequence.

7. A method comprising:
receiving television programs via an input interface, wherein each of the television programs is associated with an identifier comprising a series of textual characters;
receive a search request from a user for one of the television programs via a user interface, wherein the search request comprises a character sequence entered via a collection of individual characters presented to the user via an output interface, wherein the character sequence comprises at least one character selection selected from the collection of individual characters;
associating more than one character from the collection of individual characters with each character selected by the user, where the associating is based at least in part on organizing the collection of individual characters into multiple distinct groups of characters, wherein all characters of one group of the multiple distinct groups are associated with a character selection if the selected character comprises one of the characters of the one group;
filtering the identifiers for the television programs based on the associated characters corresponding to each character selection, wherein the identifiers comprise at least one title of at least one of the television programs; and
presenting the identifiers remaining after the filtering via the output interface for presentation to the user, wherein the identifiers comprise the at least one title of the at least one of the television programs that does not include the character sequence.

8. The method of claim 7, wherein the presenting the identifiers remaining after the filtering comprises presenting the identifiers in an electronic program guide indicating when the television programs are accessible at the input interface.

9. The method of claim 7, further comprising:
storing the television programs in a data storage;
wherein the presenting the identifiers remaining after the filtering comprises presenting the identifiers corresponding to the stored television programs.

10. The method of claim 7, wherein the filtering comprises comparing the associated characters to subsets of characters within the identifiers for the television programs.

11. The method of claim 10, wherein the comparing the associated characters to the subsets of characters within the identifiers for the television programs comprises comparing the associated characters to internal character strings within the identifiers, where the internal character strings do not include first characters beginning the identifiers.

12. The method of claim 7, wherein at least identifier of the identifiers remaining after the filtering includes the associated characters corresponding to all of the character sequence.

13. A non-transitory, processor-readable storage medium storing instructions that, when executed by one or more processors of a media device, cause the one or more processors to perform actions including:

receiving television programs via an input interface, wherein each of the television programs is associated with an identifier comprising a series of textual characters;

receive a search request from a user for one of the television programs via a user interface, wherein the search request comprises a character sequence entered via a collection of individual characters presented to the user via an output interface, wherein the character sequence comprises at least one character selection selected from the collection of individual characters;

associating more than one character from the collection of individual characters with each character selected by the user, where the associating is based at least in part on organizing the collection of individual characters into multiple distinct groups of characters, wherein all characters of one group of the multiple distinct groups are associated with a character selection if the selected character comprises one of the characters of the one group;

filtering the identifiers for the television programs based on the associated characters corresponding to each character selection, wherein the identifiers comprise at least one title of at least one of the television programs; and presenting the identifiers remaining after the filtering via the output interface for presentation to the user, wherein the identifiers comprise the at least one title of the at least one of the television programs that does not include the character sequence.

14. The non-transitory, processor-readable storage medium of claim 13, wherein the presenting the identifiers remaining after the filtering comprises presenting the identifiers in an electronic program guide indicating when the television programs are accessible at the input interface.

15. The non-transitory, processor-readable storage medium of claim 13, the actions further comprising:
storing the television programs in a data storage;
wherein the presenting the identifiers remaining after the filtering comprises presenting the identifiers corresponding to the stored television programs.

16. The non-transitory, processor-readable storage medium of claim 13, wherein the filtering comprises comparing the associated characters to subsets of characters within the identifiers for the television programs.

17. The non-transitory, processor-readable storage medium of claim 16, wherein the comparing the associated characters to the subsets of characters within the identifiers for the television programs comprises comparing the associated characters to internal character strings within the identifiers, where the internal character strings do not include first characters beginning the identifiers.

18. The non-transitory, processor-readable storage medium of claim 13, wherein at least identifier of the identifiers remaining after the filtering includes the associated characters corresponding to all of the character sequence.

* * * * *